June 2, 1925.

L. R. SPENCER

COMPOSITE PISTON

Filed Oct. 13, 1924

1,539,882

Inventor,
Louis R. Spencer,
by Harry P. Williams
Atty.

Patented June 2, 1925.

1,539,882

UNITED STATES PATENT OFFICE.

LOUIS R. SPENCER, OF WEST HARTFORD, CONNECTICUT.

COMPOSITE PISTON.

Application filed October 13, 1924. Serial No. 743,281.

*To all whom it may concern:*

Be it known that I, LOUIS R. SPENCER, a citizen of the United States, residing at West Hartford, in the county of Hartford and State of Connecticut, have invented a new and useful Improvement in Composite Pistons, of which the following is a specification.

This invention relates to the construction of composite pistons for internal combustion engines, and more particularly to the manner of securing the component elements together.

Pistons are commonly made entirely of hard metal. These have certain advantages but they also have some objectionable qualities. Pistons have been made completely of soft, light metal. These latter have some good features and others which are not wanted. A composite piston having a body of hard metal which has little expansion, and a head of light metal which radiates heat rapidly, is very desirable, for such a piston is lighter in weight, better balanced and runs cooler than a piston made entirely of hard metal, and will eliminate the burning of lubricant on the face of the head in the combustion chamber, and obviate the injurious heating effect on the lubricant in the crank case which is thrown against the inside face of the piston head, conditions which occur with a piston having a hard metal head.

The object of this invention is to provide simple, cheap and efficient means for permanently securing together a hard metal body and a soft metal head in such manner that they will not become disconnected or loosened in use, and thereby enabling the production of a durable piston having the advantages of both the old types of piston.

To this end the invention resides in a piston composed of a body of hard metal, such as cast iron, and a head of soft metal, for example aluminum, which body and head are locked together by a key of balls forced into complementary grooves in the walls of the two elements in such manner that they tend to draw the parts together and hold them so that the differences in the expansion and contraction of the metals will not affect the security with which the body and head are held together.

Figure 1:
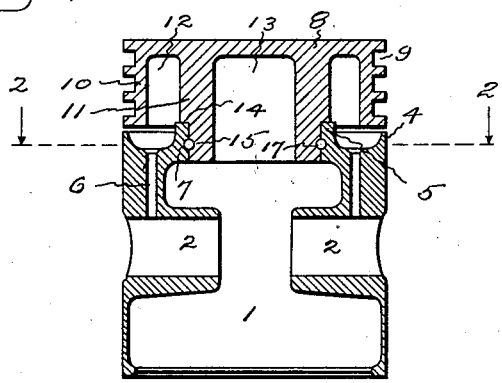
Figure 2:
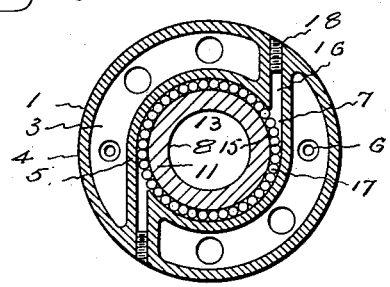
Figure 3:
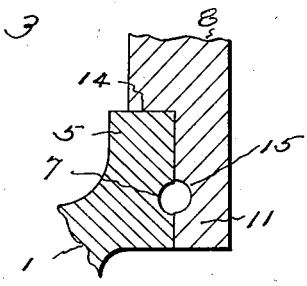

In the accompanying drawings Fig. 1 shows a central vertical section of a composite piston constructed according to this invention. Fig. 2 is a horizontal section on plane indicated by the dotted line 2—2 on Fig. 1. Fig. 3 is a detail, on larger scale, showing the preferred relations of the complementary grooves in the two elements for receiving the locking balls.

The body 1 of the piston is desirably made of cast iron, but it may be of other hard metal which has suitable wear-resisting and glazing qualities, and but little expansion when heated so that it can be closely fitted in the cylinder with which it is to be used without danger of setting when hot. This body is a hollow cylinder with a longitudinal opening from end to end. Extending into the opening from diametrically opposite sides of the body are hubs 2 that provide the wrist-pin bearings. Around the head end of the body is a channel 3, the outer wall of which is formed by the external flange 4 and the inner wall formed by the internal flange 5 that extends somewhat higher than the outer. Passages 6 are made from the channel through the hubs to permit the flow of lubricant to wrist-pins. In the inner wall of the flange 5 is a semi-circular groove 7.

The head 8 is preferably made of aluminum or some similar metal which is light in weight and that radiates heat rapidly. This head which is provided with the usual piston ring grooves 9, protects the hard metal body from the intense heat developed by the explosions of the fuel so that the temperature of the body will be relatively lowered. It lightens the structure and thus reduces the momentum of reciprocation, and it transfers the center of gravity nearer to the wrist pin than if the entire piston were made of iron. The head has an external flange 10 containing the ring grooves and an internal flange 11 with an annular recess 12 between the flanges and a chamber 13 in the center. The outer wall of the internal flange of the head is reduced in diameter and is tightly fitted into the inner wall of the internal flange of the body, so as to provide a shoulder 14 that rests upon the upper edge of the body flange. In the reduced outer wall of the inner flange of the head is a semicircular groove 15. It is desirable that this groove be slightly higher than the groove in the body flange when the head is assembled on the body and the shoulder 14 rests upon the upper end of the body flange, as illustrated in Fig. 3.

One or more passages 16 are made from the exterior through the body so as to open tangentially into the grooves. Balls 17 of a size to closely fit the grooves are forced under considerable pressure through the tangential passages into the grooves. These balls lock the head and body together and if the inner groove is slightly higher than the outer groove the shoulder on the head flange is drawn down tightly against the upper end of the body flange so as to ensure a very firm fitting of the parts. Plugs 18 are set into the passages and their ends turned down to conform to the periphery of the body.

With this construction the inner flange of the head may have considerable mass so as to rapidly conduct heat from the hot end resulting from the explosions of the fuel, to the interior of the body and also form a substantial wall for the locking groove, without materially adding to the weight of the piston. Balls that closely fit the grooves can be forced through the tangential passage so as to tightly lock the parts together and if the grooves are made a little out of line, as described, the balls will draw the parts together in such manner as to ensure not only a firm but a durable connection which will not become opened up by expansion and contraction under the great variations of temperature to which the piston is subjected when in use. A piston formed as herein set forth is very efficient and durable when used in high compression, high speed engines.

The invention claimed is:—

1. An engine piston comprising a cylindrical body of hard metal having a relatively low co-efficient of expansion and a head of light metal having a relatively high co-efficient of heat radiation, one of said members being set into the other and each provided in adjacent walls with complementary grooves, with a passage through one member from the exterior to said grooves, and balls forced into and tightly fitting said grooves and locking the parts together.

2. An engine piston comprising a cylindrical body of hard metal having a relatively low co-efficient of expansion and provided with an internal flange at its upper end, and a head of light metal having a relatively high co-efficient of heat radiation and provided with an internal flange at its lower end that is fitted into and rests upon the body flange, said flanges having complementary grooves in adjacent walls with a passage through the body from the exterior to the grooves, and balls forced into and tightly fitting said grooves and locking the head to the body.

3. An engine piston comprising a cylindrical body of hard metal having an internal flange at its upper end, a head of light metal having an internal flange at its lower end that is fitted into and rests upon the body flange, said flanges having complementary grooves in adjacent walls with a passage through the body from the exterior to the grooves, the groove in the head being slightly higher than the groove in the body, and balls forced into and tightly fitting said grooves and tending to draw the head down to the body and lock the parts together.

4. An engine piston comprising a cylindrical body of hard metal having a relatively low co-efficient of expansion, and a cylindrical head of light metal having a relatively high co-efficient of heat radiation, one of said members being set into the other and each provided in adjacent walls with semi-circular grooves, with a passage extending tangential to the grooves through the outer member, and balls forced into and tightly fitting said grooves through said passage and locking the parts together.

LOUIS R. SPENCER.